Sept. 7, 1937.   V. W. KLIESRATH   2,092,256
CLUTCH CONTROL MECHANISM
Filed Feb. 10, 1932

INVENTOR.
VICTOR W. KLIESRATH
BY
ATTORNEY

Patented Sept. 7, 1937

2,092,256

UNITED STATES PATENT OFFICE 2,092,256

CLUTCH CONTROL MECHANISM

Victor W. Kliesrath, South Bend, Ind., assignor to Bendix Aviation Corporation, South Bend, Ind., a corporation of Delaware Application February 10, 1932, Serial No. 592,170

7 Claims. (Cl. 192—.01)

This invention relates in general to vacuum operated power means for operating the clutch mechanism of an automotive vehicle and in particular to a valve structure for controlling the operation of the motor unit of the power means.

It is the principal object of the invention to improve upon the power operated clutch control mechanism disclosed in the patent to Ross I. Belcia, No. 1,470,272, dated October 9, 1923. This patent discloses an accelerator operated three-way control valve operable to either cut in or cut out the operation of a vacuum operated motor to effect, respectively, a disengagement or an engagement of the automotive clutch. The patented structure, however, fails to provide means for so controlling the engagement of the clutch as to simulate the corresponding manual operation, and the patent also fails to provide means for rendering inoperative, at will, the operation of the power mechanism.

The present invention is, therefore, specifically directed to a valve structure which retains all of the attributes of the valve of the patented structure and in addition provides means for more effectively controlling the clutch engaging operation of the clutch motor.

To the above end there is suggested a unitary valve structure comprising a one-piece rectangular-shaped casing member serving as a housing for two mutually cooperating reciprocable plunger members, one functioning as a cut-off valve member and the other as a combined control and bleed valve member.

It is, therefore, the important object of the invention to provide a compact valve unit which, incidentally, may be conveniently mounted to any suitable rigid portion of the chassis or power plant, said unit housing all of the valve controls for effectively operating the clutch controlling fluid motor.

Other objects of the invention and desirable details of construction will become apparent from the following specification, taken in conjunction with the accompanying drawing, in which.

Figure 1:
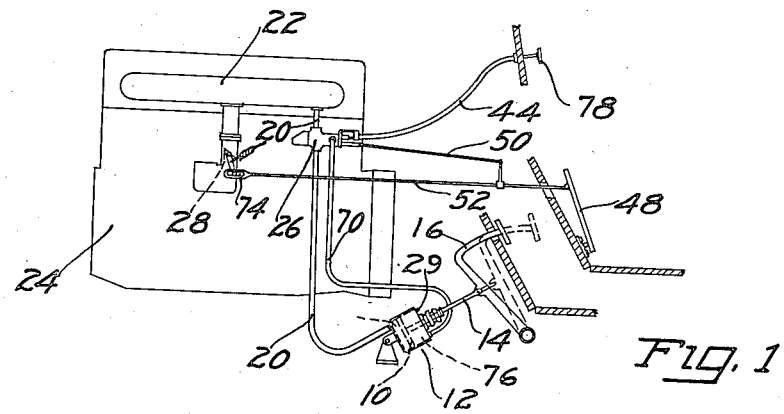
Figure 1 is a diagrammatic view of a vacuum operated clutch control mechanism embodying my invention.

There are disclosed, diagrammatically in Figure 1, the essential elements of an engine operated vacuum clutch control mechanism similar in general operation to that disclosed in the aforementioned patent. A piston 10 of a double-ended vacuum operated motor 12 is connected, by a rod 14, slotted at 15, with a conventional clutch pedal 16. The motor is adapted to be energized and deenergized to operate the clutch by alternately evacuating and venting the left compartment 18 thereof; to this end there is provided a flexible conduit 20 interconnecting the clutch motor 12 with the intake manifold 22 of the internal combustion engine 24 of the vehicle, and there is interposed in said conduit a valve unit 26 constituting the present invention, and which unit serves to completely control the operation of the motor.

As is well-known to those skilled in this art, there exists in the manifold 22 a vacuum of some twenty inches of mercury when the engine throttle 28 is closed and the engine pistons are functioning as miniature pumps. As described in detail hereinafter, a three-way control valve member, operating as a part of the valve unit 26, may be operated to place the clutch motor 12 in circuit with the manifold when the throttle is closed thereby evacuating the left compartment of the clutch motor and disengaging the clutch, as disclosed in Figure 1. A check valve 29 in the clutch motor is automatically operated to admit the atmosphere to effect this power stroke of the motor. When it is desired to reengage the clutch to utilize the engine as a brake after free wheeling or to accelerate the vehicle after the gear shifting operation, the aforementioned three-way control valve is again operated to vent the clutch motor, all as will be more completely brought out in the detailed description to follow.

Passing now to a more complete description of the structure and operation of the valve unit 26 forming the subject matter of the present invention, the same preferably comprises a rectangular-shaped casing member 30 provided with ports 32 and 34 adapted to receive the disconnected portions of the conduit 20. The casing is provided with juxtaposed parallel bores 36 and 38 adapted to receive reciprocable plunger members 40 and 42, respectively. The member 40, which serves as a cut off element, is preferably operated from the dash of the vehicle by means of a Bowden control, the conduit 44 of the control being secured at its ends to the dash and to a bracket 46 secured to the casing 30, and the cable 47 of the conduit being secured at its outer end to the end of the plunger 40. The plunger 42, different portions of which function as a three-way control valve member and as a bleed valve member, respectively, is operated jointly with the engine throttle 28 by an accelerator pedal 48, the latter being connected to the plunger and throttle by means of connected links 50 and 52.

The cut off plunger 40 is provided with an atmospheric vent slot 54 and the plunger 42 is provided with uniform and tapered slots or recesses 56 and 58, respectively, preferably spaced approximately ninety degrees from each other in the body of the plunger. Both plungers 40 and 42 are provided, at their outer ends, with reduced portions 60 and 62, respectively, providing annular recesses and the bores 36 and 38 are interconnected by a cross bore 64 in the body of the casing providing, together with the portions 60 and 62, a cross passage interconnecting the valve ports 32 and 34.

Figure 3:
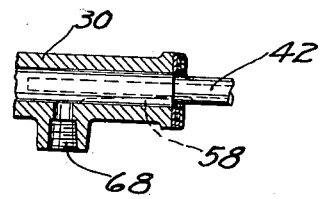
Figure 3 is a fragmentary sectional view, taken on the line 3—3 of Figure 2, disclosing, in detail, the bleed valve structure.
Figure 4:
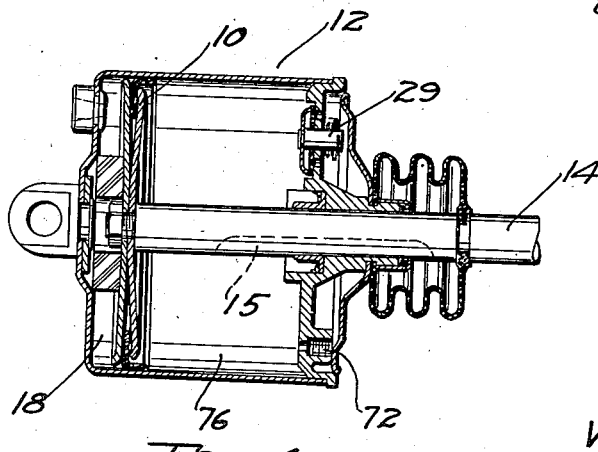
Figure 4 discloses, in longitudinal section, the clutch operating fluid motor, the operation of which is controlled by my novel valve mechanism.

The casing 30 is also provided with a vented cover plate 66 and with a side port 68, Figure 3, the latter receiving one end of a flexible conduit 70 secured at its other end to a port 72 in the clutch motor 12.

Figure 2:
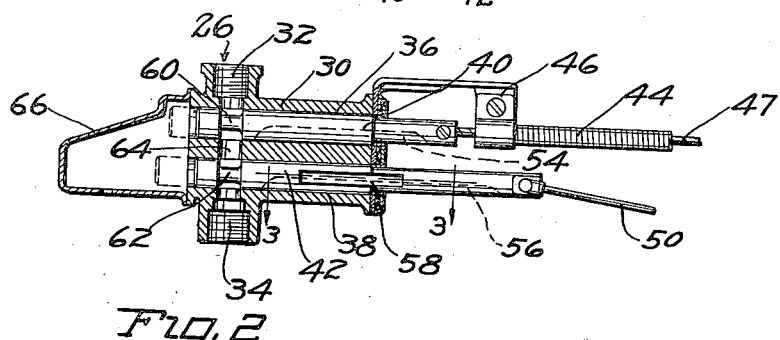
Figure 2 is a longitudinal sectional view of the valve unit constituting the present invention.

Describing now the operation of the clutch control mechanism, release of the accelerator pedal 48 serves to first permit a closing of the throttle 28 and then, by virtue of a lost motion connection at 74, effect a movement of the plunger 42 to the right to the position disclosed in Figure 2 to register the recessed end of the plunger with cross bore 64 and port 34 in the casing. The clutch motor is thus placed in circuit with the idling engine to energize the motor and disengage the clutch.

When it is desired to reengage the clutch, i. e. after an operation of the change speed transmission, the accelerator is depressed, moving the plunger 42 to the left, Figure 2, cutting off communication with the manifold via the cross bore 64 and registering the atmospheric slot 56 with port 34 to vent the left compartment of the clutch motor.

The clutch is thus permitted to engage under the action of its spring, the mode of engagement being now controlled by means of the rate of efflux of air from the right compartment 76 of the motor, which rate is determined jointly by the depth of taper of the slot 58 exposed to the port 68 and by the shape of a slot 15 and a rod 14. The driving clutch plate of the clutch mechanism moves rather rapidly during the first part of its stroke due to the relatively rapid efflux of air via slot 15 in the motor connecting rod 14, and after the slot 15 is covered the clutch plate movement, just prior to the contacting of the plates, is rendered relatively slow due to the throttled egress of air via the tapered slot 58 in the bleed valve.

The rate of movement of the driving clutch plate during the last stage of movement is thus determined by the setting of the jointly operated throttle and bleed valve, determined by the position of the accelerator pedal. With a slight opening of the throttle, for example, with the car in low or reverse gears to start the vehicle in motion, there is a corresponding relatively slow engagement of the clutch due to a relatively shallow portion of the slot 58 being exposed to port 68. This permits a slipping clutch engagement with the transmission in low or reverse gears, which is the end desired. With the transmission in either intermediate or high gears, during the stepping up of the vehicular speed, the throttle is opened to a greater extent and the clutch is engaged more rapidly due to the increased rate of air bleed from the motor. With the proposed construction if the throttle is opened rather wide, either voluntarily or involuntarily, the clutch is engaged quite rapidly and before the motor can be stepped up to a racing speed. If a high racing speed were to be reached before the clutch plates engaged, a rapid wearing of the friction surfaces would ensue, which effect is, of course, highly undesirable.

It will be appreciated from the aforementioned description that the plunger 42 serves both as a three-way control valve to initiate the disengaging and engaging operations of the clutch motor and as a bleed valve member to control the mode of clutch engagement. The cut off plunger member 40 is, during the above described operations, positioned to register its reduced portion 60 with the cross bore 64 and port 32 in the casing, thereby permitting the above described power operation of the clutch. When it is desired, however, to dispense with the power clutch control, i. e. to cut out the free wheeling operation of the vehicle, the driver pushes in on a button 78 of the Bowden control, moving the plunger 40 to the left, Figure 2 dotted lines, to register the atmospheric slot 54 therein with the cross bore 64 and thus cut off the connection with the manifold and rendering the valve member 42 inoperative. The clutch pedal 16 may thereafter be operated manually in the usual fashion.

There is thus provided a very compact and effective control valve providing, in one unit, all of the selective operations of the valve necessary to the efficient control of a vacuum operated clutch operating mechanism of the type described.

While one illustrative embodiment has been described, it is not my intention to limit the scope of the invention to that particular embodiment, or otherwise than by the terms of the appended claims.

I claim:

1. A clutch control mechanism for an automotive vehicle provided with an accelerator pedal comprising, in combination, a double-ended fluid motor operatively connected to the clutch, a control valve for said motor and connections interconnecting each end of said motor with said valve, said valve comprising a one-piece casing and a one-piece reciprocable valve member mounted for sliding movement within said casing, said latter member, depending upon its position, determining the mode of influx and/or efflux of power fluid to and from said motor, together with another reciprocable valve member mounted for sliding movement within said casing, said latter member cooperating with said first mentioned one-piece valve member to render the latter operative or inoperative, depending upon the position within the casing of the second mentioned reciprocable valve member, and independently operated manually operated means for operating each of said valve members, one of said manually operated means being operable from the dash of the vehicle and the other by the accelerator pedal.

2. In an automotive vehicle provided with a clutch throttle and a vacuum operated clutch control motor, a valve unit for controlling the operation of said clutch controlling motor comprising a one-piece casing member provided with inlet, outlet and bleed ports therein, and a one-piece reciprocable valve member mounted for sliding movement within said casing, said latter member provided with a recessed portion in its end adapted to register with the aforementioned inlet and outlet ports in the casing, and further provided with a uniformly shaped slot adapted to alternately cut in and cut out intercommunication between the atmosphere and said aforementioned inlet port, said reciprocable valve member being further provided with a tapered slot adapted to register with the bleed port in the casing and with the atmosphere and means interconnecting said throttle and valve for joint operation thereof.

3. In a power operated clutch control mechanism for an automotive vehicle provided with a clutch and a throttle, a control valve unit for said mechanism comprising a casing member provided with two bores extending lengthwise thereof, oppositely disposed ports in said casing adapted to be interconnected one with a source of power and the other with a fluid motor to be operated, and a third port in said casing also adapted to be interconnected with the aforementioned fluid motor to be operated, a cross bore in said casing interconnecting said aforementioned bores, a cut-off three-way valve piston member slidably mounted in one of said first mentioned bores, a combined three-way control and bleed valve piston member slidably mounted in the other of said first mentioned bores, said latter piston member having two angularly spaced slots therein, each serving to interconnect the motor to be operated with the atmosphere together with manually operable means for operating said throttle and valve members.

4. In a power operated clutch control mechanism for an automotive vehicle provided with a clutch and a throttle, a valve unit for said mechanism comprising a casing comprising two ports each adapted to receive a connection with a fluid motor to be operated, a longitudinally extending bore in said casing, and a reciprocable piston member slidably mounted in said bore, said member provided with two spaced slots, each of said slots adapted to interconnect one of the aforementioned ports with the atmosphere together with manually operable means for operating said throttle and valve members.

5. In a power operated clutch mechanism for an automotive vehicle provided with a clutch and a throttle, a valve unit for said mechanism comprising a casing member provided with oppositely disposed ports adapted to be connected one with a source of fluid power and the other with a fluid motor and further provided with a third port also adapted to be connected to the aforementioned fluid motor, said casing being bored to intercommunicate said ports, and a reciprocable piston member slidably mounted in said casing, said member being provided with spaced slots, one of said slots interconnecting one of said first mentioned ports with the atmosphere and the other of said slots interconnecting said aforementioned third port with the atmosphere in one position of the slidable piston member, said member also being provided with a recess to intercommunicate the first mentioned ports in another position of the piston member thereby providing three-way control valve and bleed valve means adapted to control the operations of a fluid motor together with manually operable means for operating said throttle and valve members.

6. Automotive clutch control mechanism comprising, in combination with the clutch and throttle of an automotive vehicle, a double-ended motor operatively connected to the clutch, a valve unit for controlling all of the operations of said motor, said unit including a casing member, two valve members mounted within said casing member for reciprocable movement therein, one of said valve members serving to control the influx and efflux of power fluid to and from one end of said motor and the efflux of power fluid from the other end of said motor, the other of said reciprocable valve members cooperating with the aforementioned valve member to cut in and out, at the will of the operator, the operation of the motor, and manually operable means for operating said throttle and valve members.

7. Clutch control mechanism comprising, in combination with the clutch and throttle of an automotive vehicle, a double-ended fluid motor operatively connected to the clutch, a valve unit for controlling all of the operations of said fluid motor, said unit including a casing member provided with two parallel bores, and a cross bore interconnecting said parallel bores, a reciprocable valve member mounted for sliding movement within each of said parallel bores, said valve members mutually cooperating to control the operation of the motor, one of said valve members serving as a cut-out member and the other valve member functioning jointly as a three-way control valve member and as a bleed valve member together with means accessible to the driver for operating said cut-out valve member, and other means for operating said three-way and bleed valve member and the throttle.

VICTOR W. KLIESRATH.